United States Patent [19]

Nimylowycz et al.

[11] 3,790,113
[45] Feb. 5, 1974

[54] PARACHUTE ARRANGEMENT

[75] Inventors: Osyp Nimylowycz, Philadelphia, Pa.;
George Lorenz, Clinton, Iowa

[73] Assignee: The United States of America as represented by the Secretary of the Army, Washington, D.C.

[22] Filed: Dec. 20, 1972

[21] Appl. No.: 316,954

[52] U.S. Cl. ............................................ 244/149
[51] Int. Cl. ........................................... B64d 17/54
[58] Field of Search .... 244/149, 152, 142, 147, 150

[56] References Cited
UNITED STATES PATENTS

| | | | |
|---|---|---|---|
| 3,291,423 | 12/1966 | Britton, Jr. | 244/149 |
| 3,447,769 | 6/1969 | Stencel et al. | 244/149 |

*Primary Examiner*—George E. A. Halvosa
*Assistant Examiner*—Sherman D. Basinger
*Attorney, Agent, or Firm*—Edward J. Kelly; Herbert Berl; William Sommer

[57] ABSTRACT

A parachute arrangement having a mechanical parachute spreader positioned internally of the canopy skirt and connected at one end by a lanyard to the canopy apex. An initiator firing pin mounted in the lower end of the spreader is connected by a firing lanyard to a load when deployed. A plurality of wedge-shaped slugs, each attached to parachute suspension lines, are initially latched within the mechanical spreader. An annular piston, actuated by pressure gases generated from a propellant charge, releases and ejects the slugs radially outward to assist the suspension lines in opening the parachute canopy skirt.

5 Claims, 2 Drawing Figures

PATENTED FEB 5 1974　3,790,113

PARACHUTE ARRANGEMENT

The invention described herein may be manufactured, used, and licensed by or for the Government for governmental purposes without the payment to us of any royalty thereon.

This invention relates to parachute apparatus and more particularly to a parachute arrangement that upon deployment facilitates a rapid opening of the parachute canopy skirt.

One of the objects of the invention is to provide a rapid opening parachute arrangement which is of relatively simple construction.

Another object of the invention is to provide such an arrangement which is economical to produce.

A further object of the invention is to provide such an arrangement having a centrally positioned mechanical spreader which will not hinder normal aerodynamic parachute inflation should the spreader misfire.

These and other objects, features and advantages will become more apparent from the following description and accompanying drawings in which.

Figure 2:
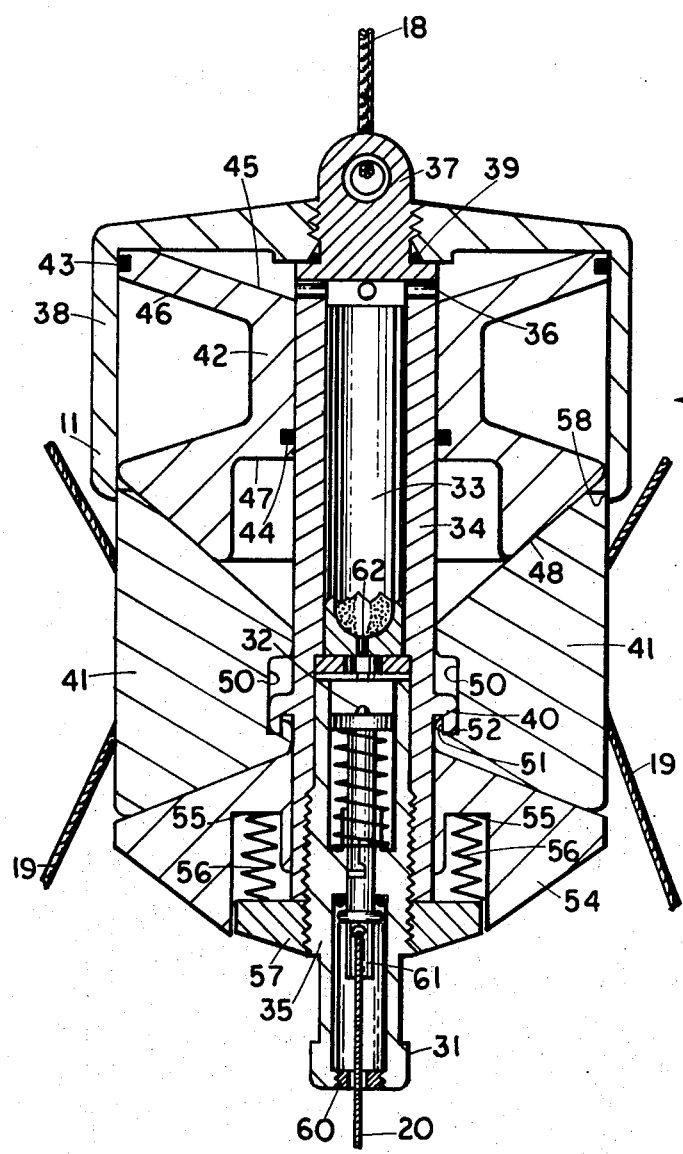
FIG. 2 is an enlarged sectional view of the FIG. 1 mechanical parachute spreader prior to actuation thereof.
Figure 1:
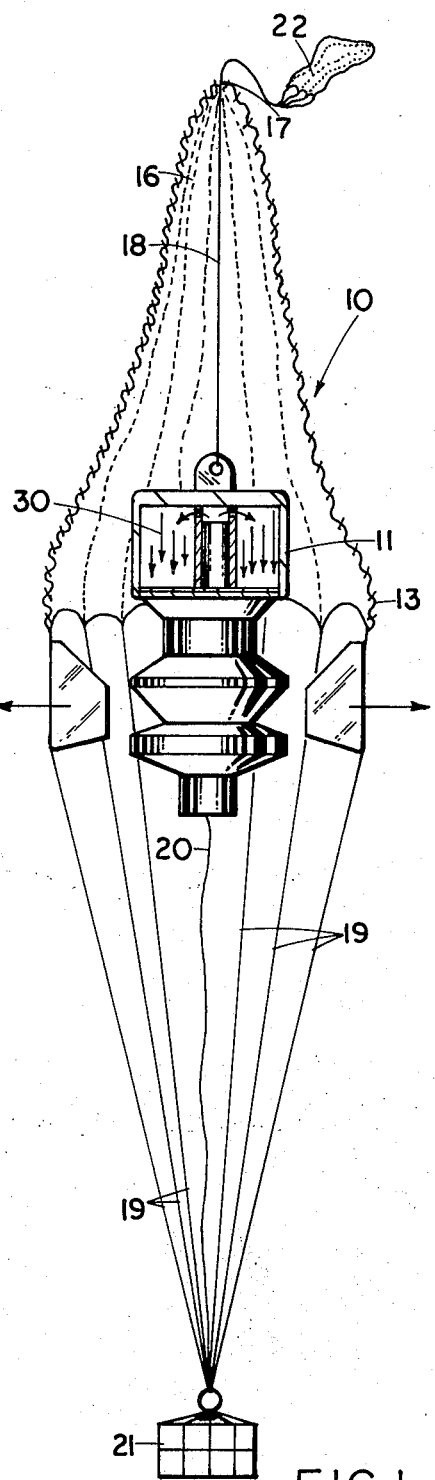
FIG. 1 is an elevational sectional view of a deployed parachute arrangement embodying the principles of the invention.

The parachute arrangement, shown generally at 10 (FIG. 1), has a mechanical parachute spreader 11 (FIG. 1, 2) suspended by lanyard 18 from the apex 17 of parachute canopy 16 to center or be normally positioned within the canopy skirt portion 13. The lower end of the mechanical spreader 11 is appropriately attached by a firing lanyard 20 to a predetermined load 21, for example cargo under delivery or the harness of an ejected aircraft occupant. When taut, the firing lanyard 20, which is of less length than each of the suspension lines 19 that connect the canopy skirt portion 13 to the load 21, actuates a sear pin of an initiator 31 in a manner to be described upon operation of the drogue chute or drogue gun 22 which is affixed to the canopy apex 17 externally of the parachute 16. The effective or total taut length of the firing lanyard 20, spreader unit 11 and lanyard 18 is less than those of each of the suspension lines 19 and their corresponding collapsed parachute canopy length at the moment the drogue chute 22 opens.

The firing pin 32 of the initiator or firing mechanism 31, by striking the primer 62, ignites the propellant charge 33 which is suitably located in the vertically oriented cartridge chamber 34 that is internally threaded at its lower end for securement of the externally threaded initiator housing 35. The upper closed end of chamber 34 has a plurality of lateral passages 36 immediately below the reduced threaded proterberance 37 which is apertured at its tip for attachment of lanyard 18 and a firm mounting for the centrally threaded opening of the base of inverted cup member 38 that serves as an upper housing for the spreader unit 11. O-ring 39 serves to seal the base of cup 38 against upward leakage. The cartridge chamber 34 has an external annular latching flange 40 for initially latching a plurality of peripherally spaced wedge-shaped slugs 41 each of which is appropriately secured to predetermined ones of the suspension lines 19.

Seated in the cup 38 is an annular piston 42, carrying suitable O-ring seals 43, 44, that surrounds and is slidingly mounted on the chamber 34. The piston 42 has a concave conical upper surface 45 that permits an area at the base of the cup to receive generated gas pressure from passages 36 (as indicated by arrow 30) for driving the piston downward. The outer surface of piston 42 has a trapezoidal shaped annular recess 46 for weight saving purposes and the piston inner surface has a downwardly opening annular recess 47 for operatively accommodating the latching flange 40. The lower portion of the piston has a conically shaped camming surface 48 against which the upper inclined mating surfaces of the slugs 41 abut upon assembly.

Each wedge-shaped slug 41 has an inwardly opening recess 50 formed in its inner surface which has a hook portion or ledge 51 at its lower end, thus defining a groove 52 that extends across the bottom of each recess 50 to receive the corresponding portions of the latching flange 40. The upper conically shaped surface of upwardly biased bushing 54 normally holds the inclined bottom surface of each slug 41 in its uppermost latched position, and the lower internal surface portion 58 of the cup sidewall upon assembly overlies an uppermost outer surface portion of each slug 41. The lower surface of the bushing 54 has a downwardly opening plurality of circular recesses 55 in which compression spring 56 are seated and retained by nut 57 that is threadedly secured to the initiator housing 35. The lower inner surface of the bushing 54 is relieved so that it can slidably move downwardly on the chamber 34 when springs 56 are compressed by operative motion of piston 42.

As the piston 42 and slugs 41 are driven downward, the slugs are released from their latched condition at 40 and 58 and further piston motion cams or ejects the slugs 41 and corresponding suspension lines 19 radially outward to rapidly initiate aerodynamic inflation of the parachute canopy 16.

A suitably apertured end plug 60 is threadedly secured to the lower end of initiator housing 35 to retain the upper end of firing lanyard 20 and the released sear pin 61 attached thereto.

Various modifications, alterations or changes may be resorted to without departing from the scope of the invention as defined in the appended claims.

We claim:

1. In a parachute arrangement having a canopy skirt depending from a canopy apex, a drogue chute secured to said canopy apex and located externally of said canopy skirt, and a plurality of suspension lines each having one end connected to said canopy skirt and another end with means for attachment to a load, a lanyard having one end connected to said canopy apex and another end secured to an upper end of a mechanical parachute spreader positioned internally of said parachute skirt, a firing lanyard having one end connected to an actuating pin of an initiator secured in a lower end of said spreader and means on the other end for attachment to said load, said spreader having an elongated cartridge chamber that is internally threaded at its lower end by which said initiator is secured, said chamber having a plurality of lateral passages in its upper end, and an external annular latching flange, a propellant cartridge substantially vertically disposed in said chamber intermediate said initiator and lateral passages, an inverted cup member secured to said propellant chamber upwardly of said lateral passages, an annular piston in said cup member and slidably mounted on and surrounding said propellant chamber, said piston having a lower conically shaped camming surface, a plurality of wedge-shaped slugs each having an outer surface connected to selected ones of said suspension lines and an inner surface slidably mounted on said propellant chamber, each of said inner surfaces having a recess and groove arrangement accommodating portions of said annular latching flange, each of said outer surfaces having upper portions engaging a lowermost inner surface of said cup member, and means resiliently biasing said slugs upwardly against said piston camming surface, so constructed and arranged that ignited propellant gases will drive said piston downwardly to free the resiliently biased slugs and eject them substantially radially outward to assist the attached suspension lines in opening the parachute canopy skirt.

2. The structure in accordance with claim 1 wherein said resiliently biasing means includes an annular member slidably mounted on and surrounding a lower portion of said propellant chamber, said annular member having an upper conically shaped camming surface engaging the lower surface of each slug and a downwardly opening annular chamber containing a compression spring.

3. The structure according to claim 2 wherein each slug recess has an upstanding hook portion in its lower wall defining a groove in which portions of said latching flange are seated.

4. The structure according to claim 3 wherein an uppermost outer surface portion of said piston carries an O-ring seal, said piston outer surface having a trapezoidal shaped annular recess, and the piston inner surface having a downwardly opening annular recess for operatively accommodating said latching flange.

5. The structure according to claim 4 wherein said piston has a concave conical upper surface.

* * * * *